US006978124B2

(12) United States Patent
Benes et al.

(10) Patent No.: US 6,978,124 B2
(45) Date of Patent: Dec. 20, 2005

(54) METHOD AND MOBILE STATION FOR AUTONOMOUSLY DETERMINING AN ANGLE OF ARRIVAL (AOA) ESTIMATION

(75) Inventors: Stanley J. Benes, Round Lake Beach, IL (US); Lawrence Downing, Hoffman Estates, IL (US); Gerald Gutowski, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 545 days.

(21) Appl. No.: 10/316,692

(22) Filed: Dec. 11, 2002

(65) Prior Publication Data

US 2004/0203539 A1 Oct. 14, 2004

(51) Int. Cl.[7] .................................................. H04B 1/02

(52) U.S. Cl. ................... 455/101; 455/110; 455/115.1; 455/115.3; 455/456.1; 342/442

(58) Field of Search ................................ 455/272–276, 455/561.1, 506, 101, 115.1, 115.3, 456.1, 455/440, 456.2, 456.6, 562.1, 517, 102–111, 455/91; 342/442, 368–384, 453

(56) References Cited

U.S. PATENT DOCUMENTS

| | | | | |
|---|---|---|---|---|
| 5,786,791 | A * | 7/1998 | Bruckert | 342/457 |
| 5,884,215 | A | 3/1999 | Birchler et al. | |
| 6,304,213 | B1 * | 10/2001 | Erceg et al. | 342/359 |
| 6,317,611 | B1 * | 11/2001 | Kobayakawa | 455/561 |
| 6,539,200 | B1 | 3/2003 | Schiff | |
| 6,700,536 | B1 | 3/2004 | Wiegand | |
| 6,759,983 | B2 | 7/2004 | Eden | |
| 6,771,988 | B2 * | 8/2004 | Matsuoka et al. | 455/562.1 |
| 6,812,889 | B2 * | 11/2004 | Alexander, Jr. | 342/442 |
| 2002/0172261 | A1 * | 11/2002 | Hershey et al. | 375/130 |
| 2003/0187601 | A1 * | 10/2003 | Dufour et al. | 702/92 |

OTHER PUBLICATIONS

International Search Report for Application No. PCT/US03/36908 dated Oct. 13, 2004.

* cited by examiner

*Primary Examiner*—Pablo N. Tran
(74) *Attorney, Agent, or Firm*—Hisashi D. Watanabe

(57) ABSTRACT

A method (900) and a mobile station (160) for autonomously determining an angle of arrival (AOA) estimation are described herein. The mobile station (160) may receive information associated with a plurality of sectors (200) from a base station (140) having a plurality of antennas. Each of the plurality of antennas may provide communication service to one of the plurality of sectors (200). The information associated with the plurality of sectors (200) may be an antenna pattern, a boresight, a downtilt, and a signal strength value associated with each of the plurality of antennas. Based on the information associated with the plurality of sectors (200), the mobile station (160) may determine an antenna gain difference, which in turn, is used to determine the angle of arrival (AOA) estimation.

1 Claim, 8 Drawing Sheets

METHOD AND MOBILE STATION FOR AUTONOMOUSLY DETERMINING AN ANGLE OF ARRIVAL (AOA) ESTIMATION

TECHNICAL FIELD

The present disclosure relates to wireless communication systems, and more particularly, to a method and a mobile station for autonomously determining an angle of arrival (AOA) estimation.

BACKGROUND

Many location-based services today such as emergency service, mobile yellow pages, and navigation assistance require knowledge of the location of a mobile station prior to providing service and/or information to the mobile station. Typically, the location-based services may query for the location information of the mobile station from a base station subsystem (BSS) or a radio access network (RAN), which in turn, may directly determine the location information from the mobile station via an uplink (i.e., from the mobile station to a base station) amplitude difference-based angle of arrival estimation (AD-AOA). In particular, the base station may take signal strength measurements on at least two directional antennas to determine the bearing (i.e., AOA) from the base station to the mobile station. The difference in signal strength may represent the difference in horizontal pattern gain between the two directional antennas. By comparing the two horizontal patterns, an AOA may be obtained. Because the base station (and/or the base station controller) performs the signal measurements and determines the location of the mobile station (i.e., latitude/longitude or x, y), the mobile station may not provide its location autonomously.

One aspect of designing a wireless communication system is to optimize resources available to the wireless communication system. In particular, one method of improving the availability of resources is to reduce the number of messages exchanged between a location service provider, a mobile station, and the BSS or the RAN. However, as noted above, the mobile station is dependent on the BSS to determine its location. Therefore, a need exists for a mobile station to determine autonomously its angle of arrival (AOA).

BRIEF DESCRIPTION OF THE DRAWINGS

This disclosure will describe several embodiments to illustrate its broad teachings. Reference is also made to the attached drawings.

DETAILED DESCRIPTION

Figure 1:
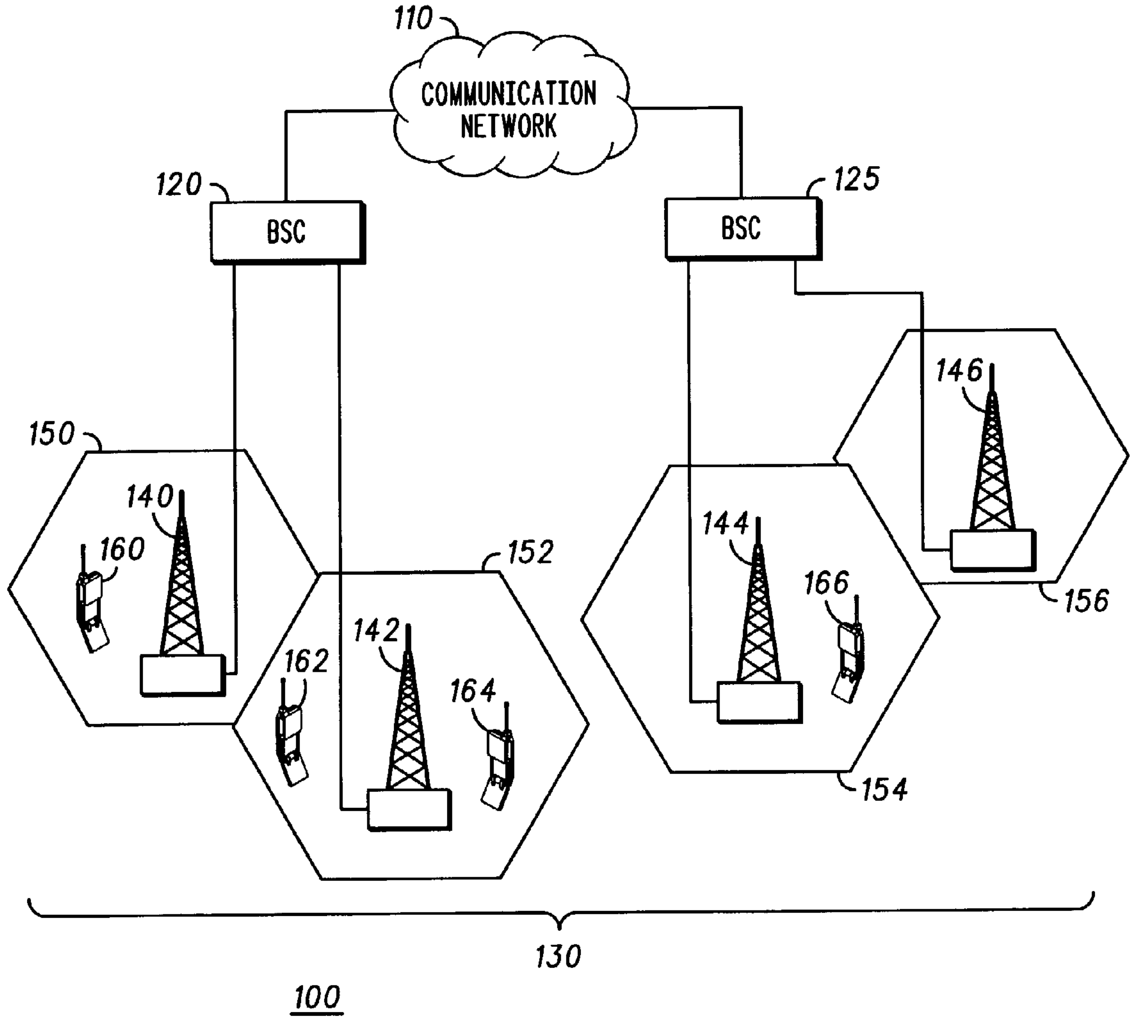
FIG. 1 is a block diagram representation of a wireless communication system.

A method and a mobile station for autonomously determining an angle of arrival (AOA) estimation are described. In a wireless communication system, a communication cell may include a plurality of sectors. The communication cell may be serviced by a base station having a plurality of antennas. Each of the plurality of antennas may provide communication services to one of the plurality of the sectors within the communication cell. A mobile station within the communication cell may automatically receive information associated with the plurality of sectors from the base station. The information associated with the plurality of sectors may include, but is not limited to, an antenna pattern, a boresight, a downtilt, and a signal strength value associated with each one of the plurality of antennas. The mobile station may receive the information associated with the plurality of sectors via a pilot signal strength measurement message or a measurement report message. Alternatively, the mobile station may request for the information associated with the plurality of sectors from the base station.

Based on the information associated with the plurality of sectors, the mobile station may determine an antenna gain difference. For example, the mobile station may calculate an effective radiated power (ERP) of a first downlink signal and a second downlink signal. The first downlink signal may be associated with a first antenna, and the second downlink signal may be associated with a second antenna. Based on the ERPs, the mobile station may calculate a signal difference between the first and second downlink signals, and normalize the first and second downlink signals. That is, the mobile station may compare the peak ERPs of the first and second downlink signals to determine the signal difference. Then, the mobile station may calibrate the peak ERPs to a given power level such as 0 dB. The mobile station may compare the ERPs between the normalized first and second downlink signals to determine the antenna gain difference. Based on the antenna gain difference, the mobile station may determine an angle of arrival (AOA) estimation within the mobile station. The AOA estimation may be a bearing that corresponds to the antenna gain difference. In particular, the AOA estimation may be a bearing along the stronger downlink signal of the first and second signals where the antenna gain difference matches the signal difference (i.e., the antenna gain difference and the signal difference are equal). For example, the first downlink signal may have a greater peak ERP than the second downlink signal. As a result, the mobile station determines the AOA estimation along first downlink signal where the antenna gain difference is equal to the signal difference.

A communication system in accordance with the present disclosure is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular system, the IS-95 Code Division Multiple Access (CDMA) digital cellular system, the CDMA 2000 system, the Wideband CDMA (W-CDMA) system, the Personal Communications System (PCS), the Third Generation (3G) system, the Universal Mobile Telecommunications System (UMTS) and variations and evolutions of these protocols.

A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations may be controlled by a base station controller. Thus, the base station controller operates in conjunction with the base station as part of the base station subsystem to provide the mobile station with real-time voice, data, and multimedia services (e.g., a call).

Referring to FIG. 1, a wireless communication system 100 includes a communication network 110, and a plurality of base station controllers (BSC), generally shown as 120 and 125, servicing a total service area 130. As is known for such systems, each BSC 120 and 125 has associated therewith a plurality of base stations (BS), generally shown as 140, 142, 144, and 146, servicing communication cells, generally shown as 150, 152, 154, and 156, within the total service area 130. The BSCs 120 and 125, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
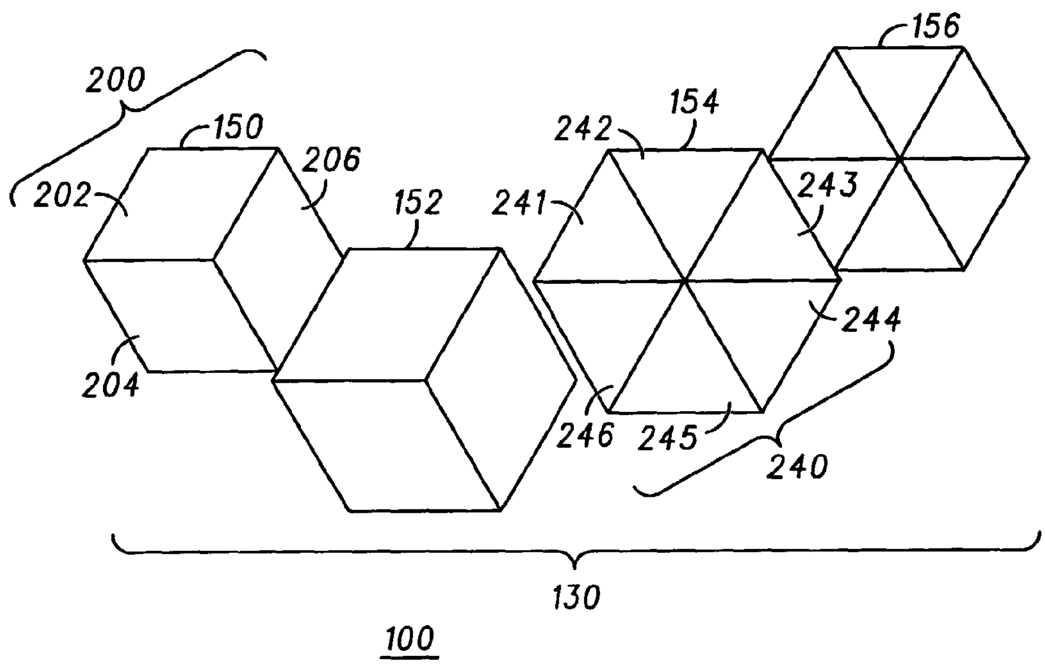
FIG. 2 is a block diagram representation of communication cells.

Each communication cells 150, 152, 154, and 156 may be divided into sectors to optimize communication resources. Referring to FIG. 2, for example, the communication cell 150 may be separated into three (3) sectors 200, generally shown as 202, 204, and 206. Each of the three sectors 200 may correspond to one or more directional antennas. Typically, the directional antennas are mounted on a base station (one shown as 140) providing communication service to the communication cell 150. Each of the directional antennas may be aligned to a boresight and a downtilt. The boresight of an antenna is the direction in which the antenna is pointed toward (i.e., the bearing of the antenna). The downtilt of an antenna is the angle deviated from the horizon (i.e., 0°) while being directed at the boresight. The directional antenna may only receive or transmit radio waves in or from a particular direction specified by the boresight because an antenna pattern of a directional antenna is not omnidirectional (i.e., any direction). In another example, the communication cell 154 may be separated into six (6) sectors 240, generally shown as 241, 242, 243, 244, 245, and 246. Persons of ordinary skill in the art will readily appreciate that the communication cells 150, 152, 154 and 156 may be separated into other numbers of sectors.

Figure 3:
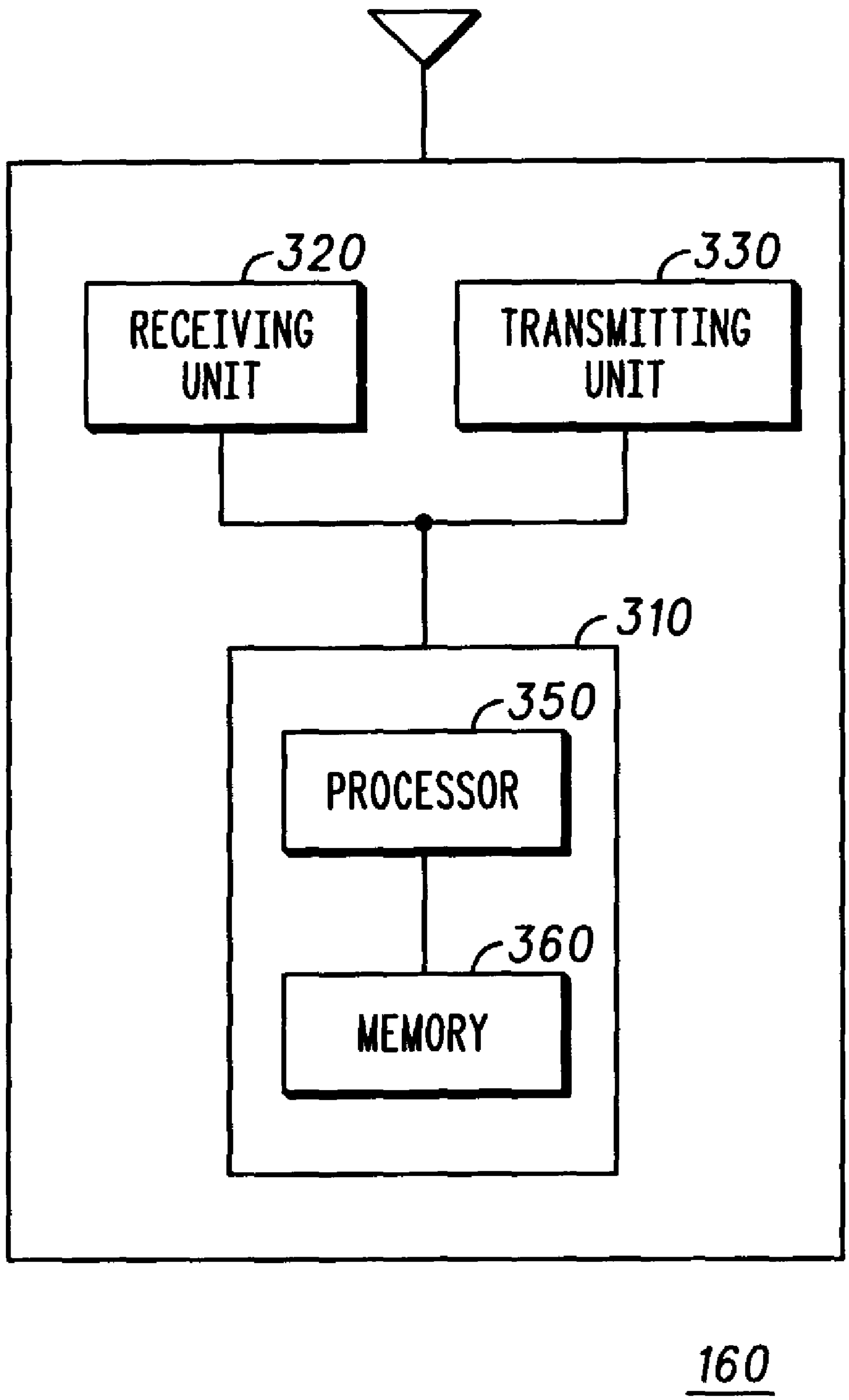
FIG. 3 is a block diagram representation of a mobile station.

Referring to FIG. 3, a mobile station (one shown as 160 in FIG. 1) adapted to determine autonomously its location is shown. The mobile station 160 generally includes a controller 310, a receiving unit 320, and a transmitting unit 330. The controller 310 includes a processor 350 and a memory 360. The processor 350 is operatively coupled to the memory 360, which stores a program or a set of operating instructions for the processor 350. The processor 350 executes the program or the set of operating instructions such that the mobile station 160 operates as described herein. The program of the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media. The receiving unit 320 and the transmitting unit 330 are operatively coupled to the controller 310. Persons of ordinary skill in the art will readily appreciate that the receiving unit 320 and the transmitting unit 330 may be separate components as shown in FIG. 3 or integrated into a single component (e.g., a transceiver unit).

A basic flow for autonomously determining location of the mobile station 160 shown in FIG. 3 may start with the mobile station 160 requesting for information associated with the plurality of sectors 200. As noted above, each of the plurality of the sectors 200 may correspond to an antenna. The information associated with the plurality of sectors may include, but is not limited to, an antenna pattern, a boresight, a downtilt and a signal strength value associated with each antenna corresponding to the plurality of sectors 200.

Upon receiving the information associated with the plurality of sectors, the mobile station 160 may determine a power parameter associated with each of the plurality of antennas. For example, the mobile station 160 may determine an effective radiated power (ERP) associated with each of a first sector 202 and a second sector 204 based on their respective signal strength values. Persons of ordinary skill in the art will readily appreciate that the ERPs may be compensated for gain differences of the antennas and losses from cables and connectors coupled to the antennas.

Figure 4:
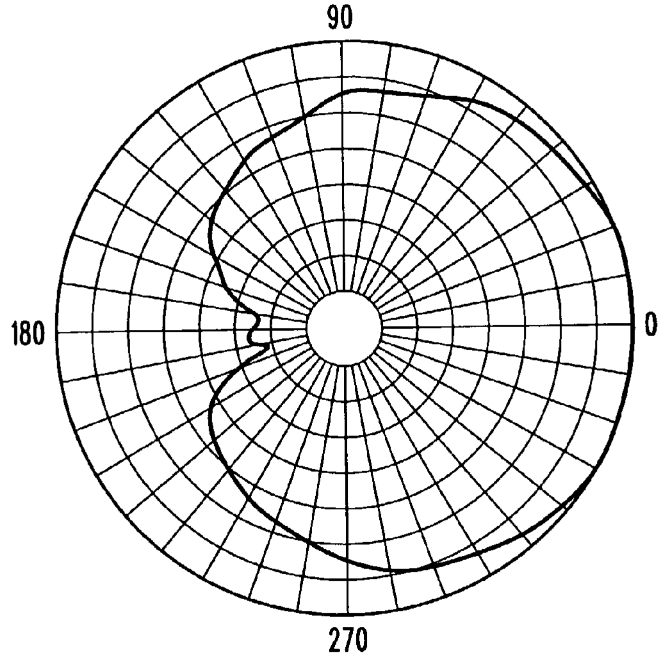
FIGS. 4, 5, 6 and 7 are polar plot representations of antenna patterns.

Referring to FIG. 4, an antenna pattern 410 (i.e., physical property of an antenna) associated with an antenna is shown. The antenna pattern 410 may indicate the variation of field intensity of an antenna as an angular function with respect to an axis, i.e., either a horizontal or vertical plane. In particular, the antenna pattern 410 may have a reference boresight (i.e., a direction in which the antenna may be pointed) of 0°. Although the embodiments disclosed herein are particularly well suited for use with horizontal patterns, persons of ordinary skill in the art will readily appreciate that the teachings of this disclosure are in no way limited to the horizontal patterns shown in FIGS. 4, 5, 6 and 7. On the contrary, persons of ordinary skill in the art will readily appreciate that the teachings of this disclosure can be employed with a vertical pattern of the antenna. Depending on the desired accuracy and/or the available storage capacity, the antenna pattern 310 may be entirely digitized and stored with the mobile station 160.

Figure 5:
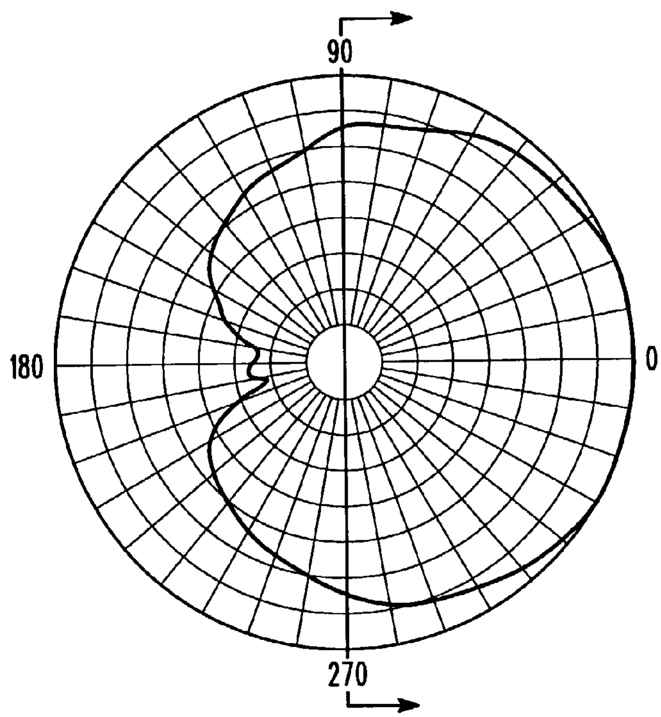
Figure 6:
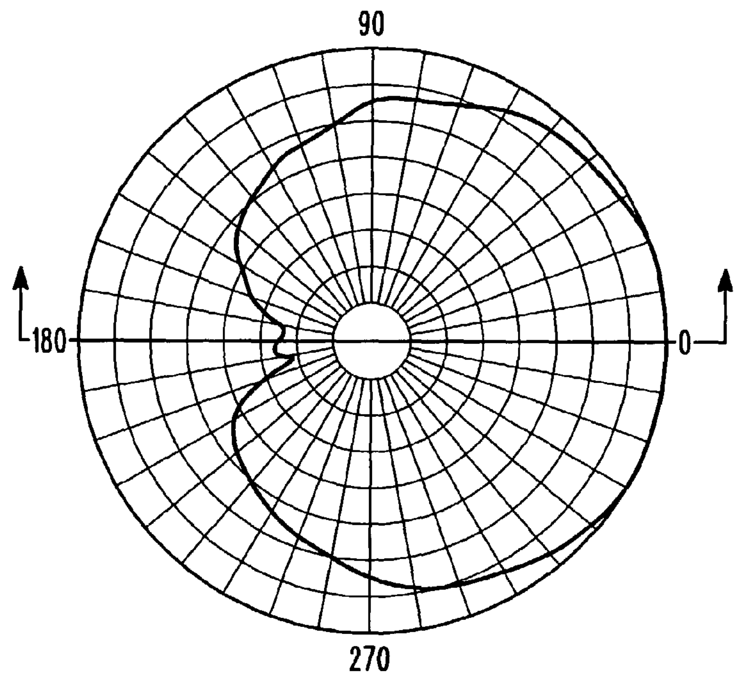

To reduce data storage, only a portion of the pattern 410 may need to be digitized. For example, the pattern 410 may be digitized from 90° through 0° to 270° as shown in FIG. 5 (i.e., "front" half of the pattern 410). Typically in a multi-sector communication cell 150, the base stations 140 may provide full azimuthal coverage from the "front" half of three (3) or more antennas. As a result, the entire antenna pattern 410 (i.e., 360°) of each antenna may not be needed.

Because a typical antenna pattern is symmetrical about the 0°/180° axis, a top portion of the antenna pattern 310 may need to be stored. Referring for FIG. 6, the antenna pattern 310 may be symmetrical about the 0°/180° axis. That is, the top portion 510 of the antenna pattern 310 may be a mirror image of the bottom portion 520 of the antenna pattern 310. Thus, either the top portion 510 or the bottom portion 520 of the antenna pattern 310 may be used instead of storing both top and bottom portions 510, 520 of the antenna pattern 310.

Figure 7:
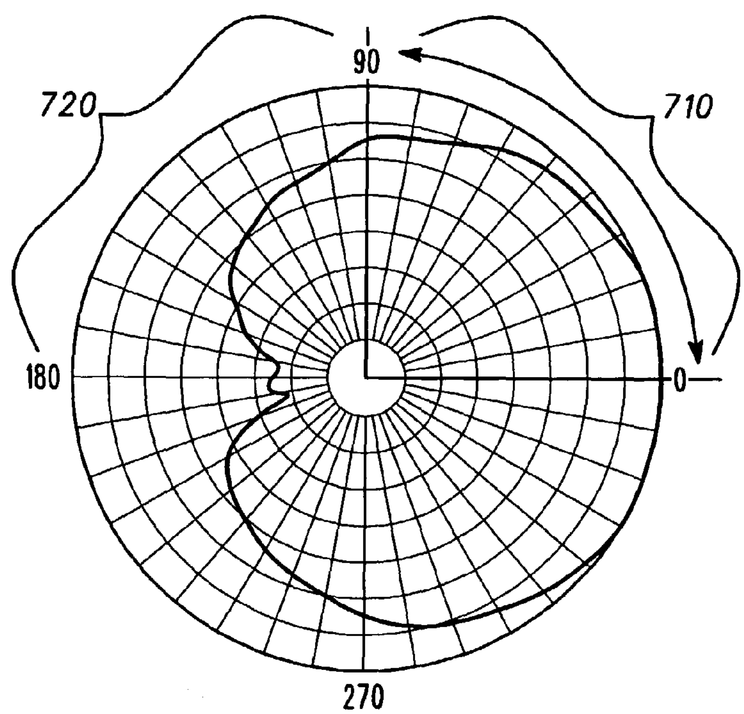

Data store may be further reduced by storing a quadrant of the antenna pattern 310. Referring to FIG. 7, for example, the quadrant 610 of the antenna pattern 310 may be stored because the antenna pattern 310 may be symmetrical about the 0°/180° axis, and the entire antenna pattern 310 may not be necessary (i.e., the quadrant 620 may not be necessary).

Figure 8:
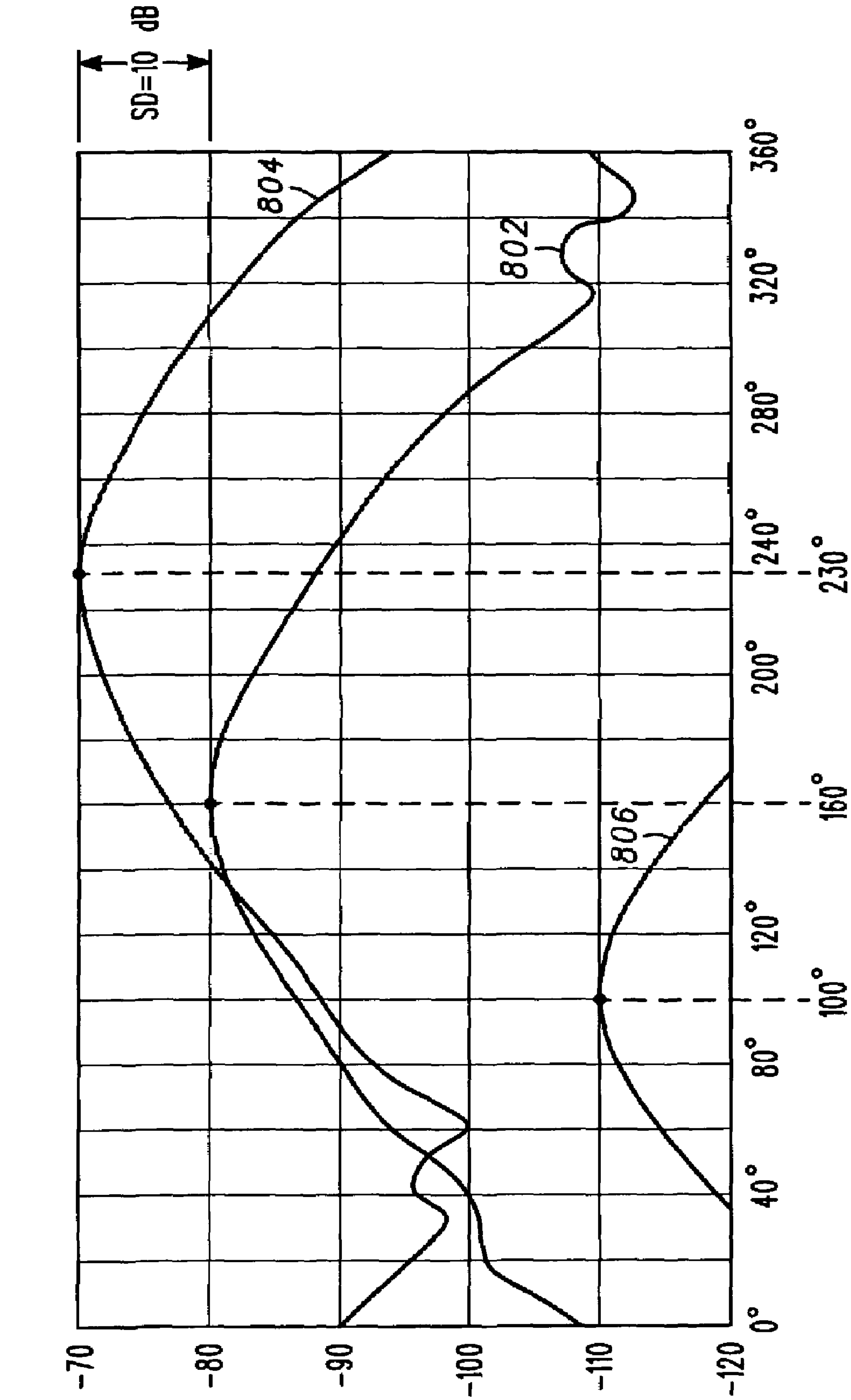
FIGS. 8 and 9 are linear plot representations of antenna patterns.
Figure 9:
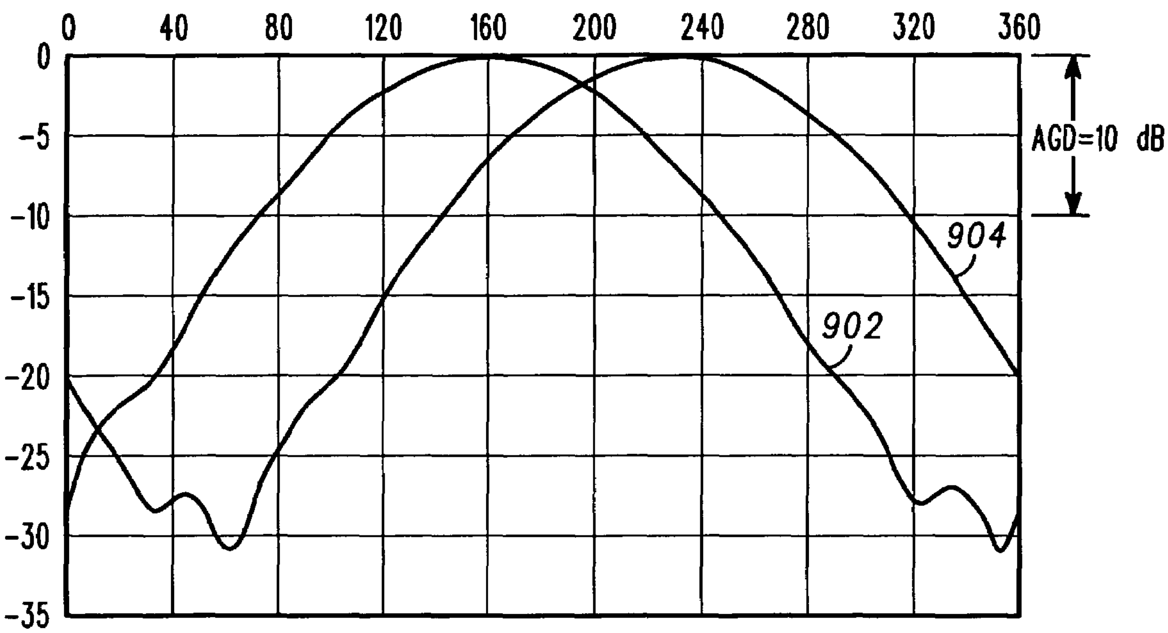

Based on the antenna patterns, the mobile station 160 may autonomously determine an angle of arrival (AOA) estimation by comparing ERPs between the antennas of at least two sectors in a communication cell. To illustrate the concept of determining an AOA estimation, downlink signals from antennas associated with the first sector 202 and the second sector 204 are shown in FIGS. 8 and 9 (i.e., FIGS. 8 and 9 are linear plots whereas FIGS. 4–7 are polar plots). In particular, a downlink signal 802 from the antenna associated with the first sector 202 has a boresight of 160° azimuth (i.e., degrees from north) and an effective radiated power (ERP) of −80 dB, a downlink signal 804 from the antenna associated with the second sector 204 has a boresight of 230° azimuth and an ERP of −70 dB, and a downlink signal 806 from the antenna associated with the third sector 206 has a boresight of 100° and an ERP of −110 dB. As noted above, persons of ordinary skill in the art will readily appreciate that the ERPs may be compensated for gain differences of the antennas and losses from cables and connectors coupled to the antennas. Based on the ERPs, the mobile station 160 may calculate a signal difference (SD) between the peaks of the downlink signals 802, 804 associated with the antennas corresponding to the first and second sectors 202, 204. For example, the mobile station 160 may determine a signal difference of 10 dB between the first sector 202 and the second sector 204. With stronger peak ERPs in the downlink signals 802, 804 from the antennas associated with the first and second sectors 202, 204, downlink signals with weaker peak ERPs such as the downlink signal 806 from the antenna associated with the third sector 206 may not be necessary to determine the AOA estimation.

To determine an antenna gain difference (AGD) for comparison with the signal difference, the mobile station 160 may normalize the downlink signals 802, 804 from the antennas associated with the first and second sectors 202, 204 (shown as 902 and 904, respectively, in FIG. 9). For example, the peak ERPs of the normalized downlink signals 902, 904 may be calibrated to 0 dB. Based on the antenna gain difference, the mobile station 160 may determine an angle of arrival (AOA) estimation. In particular, the mobile station 160 may determine a bearing along the stronger downlink signal where the antenna gain difference matches the signal difference (i.e., where the antenna gain difference is equal to the signal difference). Following the above example, the mobile station 160 may determine that the downlink signal 804 from the antenna associated with the second sector 204 is stronger than the downlink signal 802 from the antenna associated with the first sector 202 (i.e., a peak ERP of −70 dB is greater a peak ERP of −80 dB, respectively). Accordingly, the mobile station 160 may determine where along the normalized downlink signal 904 from the antenna associated with the second sector 204 the antenna gain difference matches the signal difference calculated above. As shown in FIG. 9, the antenna gain difference is 10 dB along the bearing of 240° azimuth on the normalized downlink signal 904 from the antenna associated with the second sector 204. As a result, the bearing of the mobile station 160 is 240° azimuth.

Figure 10:
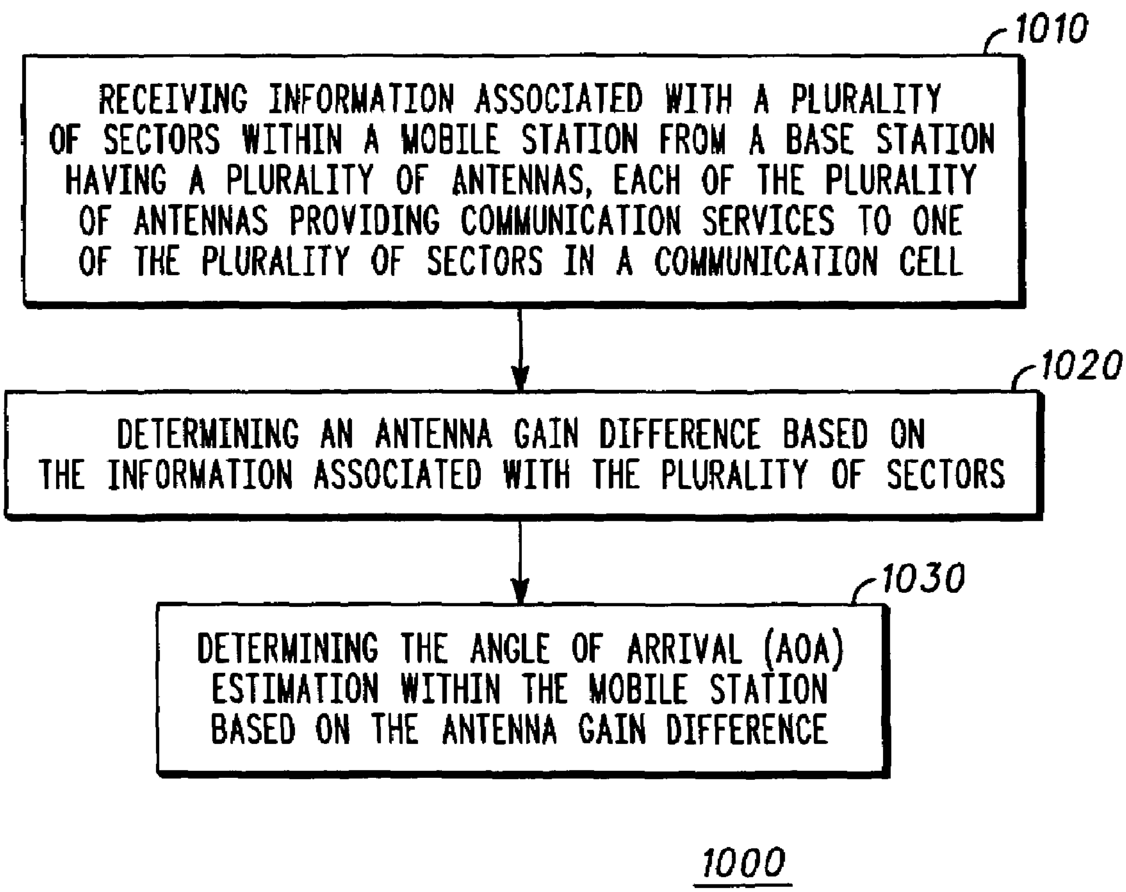
FIG. 10 is a flow diagram illustrating a method for autonomously determining an angle of arrival (AOA) estimation of a mobile station.

One possible implementation of the computer program executed by the mobile station 160 (e.g., via the processor 350) is illustrated in FIG. 10. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 10, persons of ordinary skill in the art will appreciate that these steps can be performed in other temporal sequences. Again, the flow chart 1000 is merely provided as an example of one way to program the mobile station 160 to determine autonomously its location. The flow chart 1000 begins at step 1010, wherein the mobile station 160 may request for information associated with a plurality of sectors from a base station. The base station may include a plurality of antennas. Each of the plurality of antennas may provide communication services to one of the plurality of sectors. In response to the request, the mobile station 160 at step 1020 may receive information associated with the plurality of sectors. In particular, the information associated with the plurality of sectors may include, but is not limited to, antenna patterns, boresights, downtilts, and signal strength values associated with the plurality of antennas. Alternatively, the mobile station 160 may automatically receive the information associated with the plurality of sectors from the base station (i.e., without a request).

Based on the information associated with the plurality of sectors, the mobile station 160 at step 1030 may determine an antenna gain difference. For example, the mobile station 160 may calculate an effective radiated power (ERP) of a first downlink signal and a second downlink signal, the first downlink signal being associated with a first antenna and the second downlink signal being associated with a second antenna. Based on the ERPs, the mobile station 160 may calculate a signal difference (e.g., a change in dB) between the first and second downlink signals. That is, the mobile station 160 may compare the peak ERPs of the first and second downlink signals. To determine the antenna gain difference, the mobile station 160 may normalize the first and second downlink signals and compare the ERPs between the normalized first and second downlink signals.

At step 1040, the mobile station 160 may determine an angle of arrival (AOA) estimation based on the antenna gain difference between the ERPs of the first and second downlink signals. The AOA estimation may be a bearing on the stronger downlink signal of the first and second downlink signals where the antenna gain difference between the first and second downlink signals corresponds to the signal difference. That is, the stronger downlink signal is the signal with a greater peak ERP before being normalized with the other signal. In FIG. 8, for example, the signal 804 with a peak ERP of −70 dB (i.e., 204) is stronger than the signal 802 with a peak ERP of −80 dB (i.e., 202). As a result, the mobile station 160 may determine the AOA estimation along the normalized version of the signal 804 (shown as 904 in FIG. 9) where the antenna gain difference is equal to the signal difference.

Although the embodiments disclosed herein are particularly well suited for use with a cellular telephone, persons of ordinary skill in the art will readily appreciate that the teachings of this disclosure are in no way limited to cellular telephones. On the contrary, persons of ordinary skill in the art will readily appreciate that the teachings of this disclosure can be employed with any wireless communication device such as, but not limited to, a pager and a personal digital assistant (PDA).

Many changes and modifications to the embodiments described herein could be made. The scope of some changes is discussed above. The scope of others will become apparent from the appended claims.

What is claimed is:

1. In a wireless communication system, wherein a communication cell includes a plurality of sectors, a method for autonomously determining an angle of arrival (AOA) estimation of a mobile station, the method comprising:

requesting within the mobile station information associated with the plurality of sectors from a base station having a plurality of antennas, each of the plurality of antennas providing communication service to one of the plurality of sectors in the communication cell;

receiving the requested information associated with the plurality of sectors;

determining a signal difference between a first downlink signal and a second downlink signal based on the requested information associated with the plurality of sectors, the first downlink signal being associated with a first antenna of the base station and the second downlink signal being associated with a second antenna of the base station;

normalizing the first and second downlink signals to determine an antenna gain difference between the first and second downlink signals; and determining a bearing along the first downlink signal in which the signal difference matches the antenna gain difference, the first downlink signal having greater signal strength than the second downlink signal.

* * * * *